United States Patent [19]

Kellberg et al.

[11] 4,210,126
[45] Jul. 1, 1980

[54] SOLAR ENERGY COLLECTOR

[75] Inventors: Howard E. Kellberg; Arthur H. Wilder, both of Corning, N.Y.

[73] Assignee: Corning Glass Works, Corning, N.Y.

[21] Appl. No.: 884,896

[22] Filed: Mar. 9, 1978

[51] Int. Cl.² .................................................. F24J 3/02
[52] U.S. Cl. .................................... 126/443; 126/448; 126/450
[58] Field of Search ............... 126/270, 271, 432, 442, 126/443, 448, 450

[56] References Cited

U.S. PATENT DOCUMENTS

| | | | |
|---|---|---|---|
| 1,801,710 | 4/1931 | Abbot | 126/271 |
| 4,091,793 | 5/1978 | Hermann et al. | 126/271 |
| 4,094,301 | 6/1978 | Sorenson et al. | 126/271 |
| 4,116,225 | 9/1978 | Ortabasi | 126/271 |
| 4,142,511 | 3/1979 | Doughty et al. | 126/271 |
| 4,144,875 | 3/1979 | Bruno et al. | 126/271 |

Primary Examiner—Carroll B. Dority, Jr.
Attorney, Agent, or Firm—John P. DeLuca; Burton R. Turner

[57] ABSTRACT

A solar energy collector structure has been provided which comprises a plurality of at least partially evacuated tubular members arranged in a group lying in parallel axial alignment. Each tubular member is joined to a next adjacent tubular member of the group to form a self supporting structure having at least one enclosed flow channel defined by intersticies of tubular members so joined. An absorber surface, disposed in communication with the flow channel, intercepts and absorbs solar energy, which is carried by a working fluid in the heat exchange relation with the absorber surface.

10 Claims, 6 Drawing Figures

SOLAR ENERGY COLLECTOR

BACKGROUND OF THE INVENTION

The present invention relates to apparatus adapted for the collection of solar radiation and particularly relates to nontracking, "flat plate" type devices.

A typical flat plate solar collector of the prior art consists generally of an open box-like structure having insulated back and side members and a single or double pane window or cover sheet (usually glass) adapted to cover the open side of the box. A black absorber of some appropriate material is disposed within the structure for absorbing incident solar radiation which passes through the window. Inlets and outlets are provided for passing a working fluid in heat exchange relation with the black absorber surface for removing sensible heat from the collector surface. The heated working fluid may be thereafter utilized in any number of different heating and storage arrangements.

In a typical collector of the prior art, the black absorber may be a sheet of material, usually metal, which is painted black or otherwise treated with appropiate materials to render the surface highly absorbent to incident radiation. The absorber surface may be one of the selective types, which exhibits a high absorptivity $\alpha$ (low reflectance) characteristic to incident visible radiation and has reasonably low emissivity $\epsilon$ (high reflectance) for infrared radiation, so that a high percentage of incident solar radiation is absorbed with low re-radiation of thermal infrared to the ambient. A typical window, which intercepts the incident solar radiation, being a double pane arrangement of clear glass or plastic, with an air space therebetween, provides some insulation from the ambience. The aforementioned arrangement may improve the efficiency of the collector considerably. By its nature, however, it has an upper limit of efficiency, due to residual convection loss caused by circulating air between the panes, conduction through the air and window, and radiation from the absorber.

The efficiency of such flat plate collectors would be enhanced further by evacuation of the air space between the panes. Conventional flat plates, with large cover sheets of glass do not lend themselves to evacuation due to the inherent weakness in glass strength caused by tensile stresses produced under such a one-sided vacuum arrangement. One way to avoid this strength problem is to use a cylindrically shaped glass envelope to maintain vacuum around an absorber disposed therein. Because glass is strong under compression and due to the compressive nature of such stresses, glass tubing, even with very thin walls, can constitute an ideal structure for an evacuated collector. While plastic might be used, problems of window collapse, outgassing, and water diffusion limit the effectiveness of plastic, most probably to tubular arrangements with low quality vacuum.

In a typical evacuated collector of the type just described, an absorber surface gives up heat to a working fluid passing in heat exchange relation with the absorber. The working fluid may be passed through a U-tube attached to the absorber and connected to a manifold through the tube walls. Such an arrangement, while highly efficient, is costly, since high quality vacuum and glass-to-metal seals are expensive to produce and maintain. Furthermore metal components (usually copper or aluminum) are fabricated from strategic and energy intensive materials.

Another type of collector uses a double wall vacuum bottle as a window. The internal concentric wall of the bottle acts as an abosorber, or alternatively an absorber plate is a concentric metal element sleeved within the inner bottle. Working fluid is passed in heat exchange relation with the absorber in either open or closed circuit relation. Such systems, while effective, suffer from high cost, problems with manifolding, and do not lend themselves to high speed manufacturing technology.

In a closed system mentioned above, tubes or conduits, in intimate contact with the absorber surface, carry the working fluid (usually liquid). In an open system, working fluid may be trickled over the absorber surface in an open channel or direct contact arrangement. Such structures must be sealed in order to weatherproof and/or maintain vacuum of the system for proper functioning. Furthermore, if a closed system with liquid working fluid is utilized, the fluid must be chosen to reduce the possibility of freezing when the system is not in use (e.g. nights and cold cloudy days), or boiling leading to overpressure when the heat is not being used.

While, the climatic factors of the environment where the collector is to be used, the fuel type to be replaced by the collector and the energy load characteristics (e.g. hot water, heating, cooling) are important considerations when evaluating the design of a solar collector, by far the most important feature to consider is the solar system cost and the solar system performance. If the cost is too high for a given performance level, the solar collector will not become competitive with conventional fuels. Notwithstanding the fact that the future use of conventional fossil fuels is limited, with most recent estimates projecting an exhaustion of known reserves of oil and natural gas within this century, a solar collector having high system performance and relatively low cost must be produced before such systems will become viable alternatives to diminishing conventional fuel supplies. In addition, since nuclear energy sources and coal reserves exist in sufficient quantities to provide the necessary space heating energy requirements for the foreseeable future, a solar collector must at least compete with these types of fuels. Even if projected cost per BTU of these fuels doubles or even triples in the future, for a solar system to be competitive, cost must be sufficiently reduced to provide incentive for its use in the near future.

In addition to the foregoing, it is necessary that the amount and cost of materials required for the construction of an efficient solar collector be reduced to a minimum, since relatively large areas of collector surface are necessary to capture the heat sufficient to condition the spaces contemplated. For example, the classical double pane-flat plate collector requires in the order of 3–5 pounds of glass, 2 pounds of copper or other absorber material and about 2–3 pounds of insulation, framing, and encapsulation materials, plus sealants, for each square foot of absorber surface. Consequently if solar collector devices are to become a viable alternative, the material requirements must be substantially reduced, not only because the cost effectiveness will increase, but also because, in the long view, strategic and energy intensive materials such as copper and aluminum should be conserved.

The discussion herein is in terms of cost and performance of the collector based upon square footage of absorber area. In certain cases the total collector structure cost per square foot (insulation, absorber, plumbing, and glazing), is high relative to effective absorber area. In the latter case the structure area is the basis for cost or performance calculations. If, as contemplated in the present invention, the major portion of the collector structure is functionally equivalent to absorber area, the former basis is a valid criteria.

It is important to realize that every area exerts different constraints on the solar system performance requirements. Total sunlight, average ambient atmosphere (e.g., degree days), percent of heating requirements offset by the solar system, and the length of the heating and cooling seasons, are basic parameters for calculating such variables as total collector surface necessary and the type and volume of storage required, which is compatible therewith. Further, each dwelling or structure requires individualized attention to particular constraints, e.g. the number of windows, exposure, type and quality of insulation, type of the dwelling, etc. In this connection, it is important to note that, as the collector structure becomes more complex the manufacturing and materials cost become more difficult to reduce.

The solar collector of the present invention is designed to obviate many of the disadvantages and limitations of the described prior arrangements by providing a simplified structure exhibiting increased efficiency in performance and minimized cost in fabrication, combined with high speed production rates.

SUMMARY OF THE INVENTION

There has been provided a solar collector structure comprising a plurality of at least partially evacuated tubular members substantially transparent to incident solar radiation, said tubular members being arranged in a group and lying in parallel axial alignment. Each tubular member is joined to a next adjacent tubular member of the group to form a self-supporting structure having at least one enclosed flow channel defined by intersticies between the tubular members so joined. An absorber surface is disposed in communication with the flow channel for intercepting and absorbing solar radiation impinging thereon.

In certain drawings section lines for the tube walls are omitted for clarity.

DESCRIPTION OF THE PREFERRED EMBODIMENTS

Figure 1:
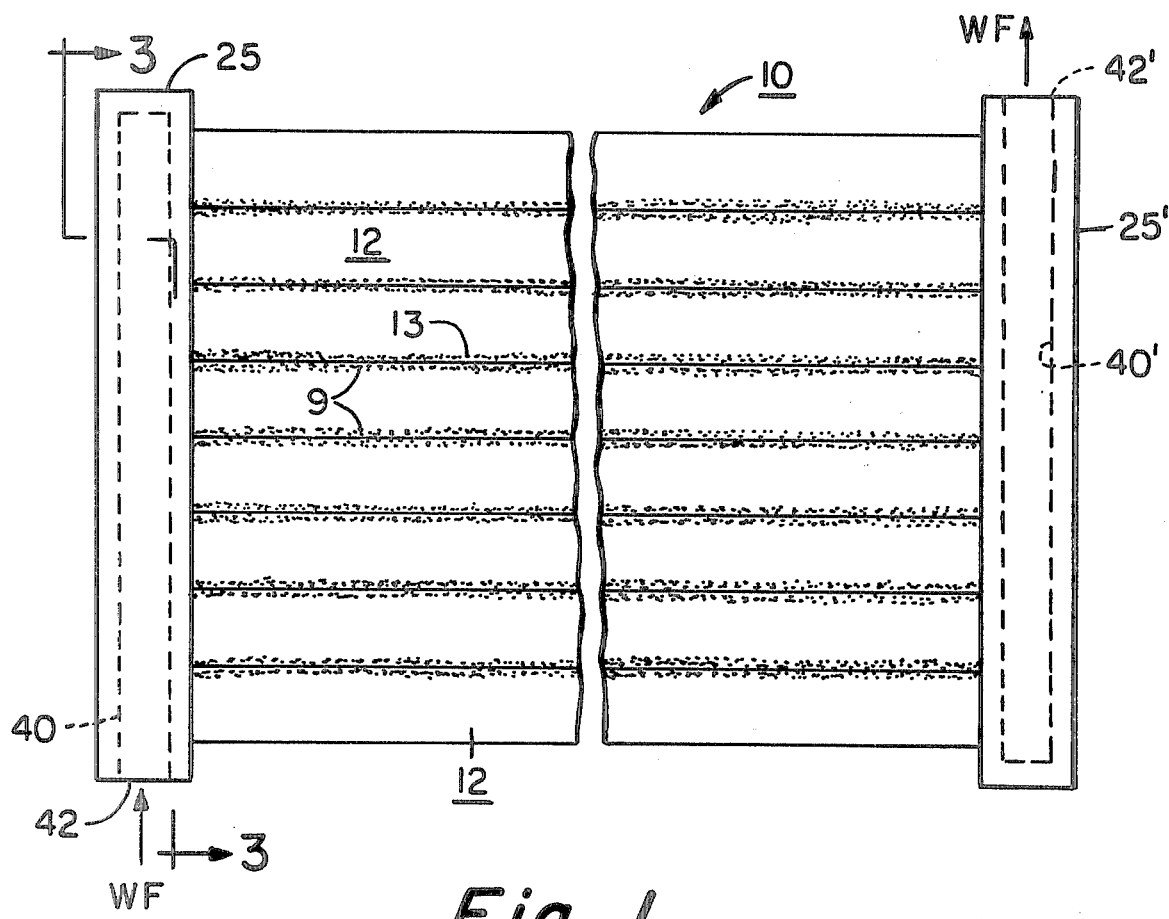
FIG. 1 is a fragmental end section in plan of a solar collector constructed in accordance with the principles of the present invention.
Figure 2:
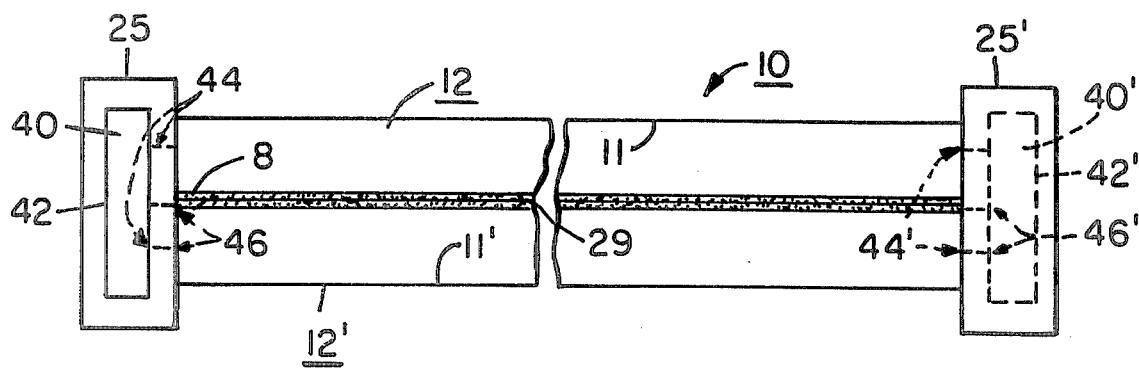
FIG. 2 is a side view of the solar collector illustrated in FIG. 1.
Figure 3:
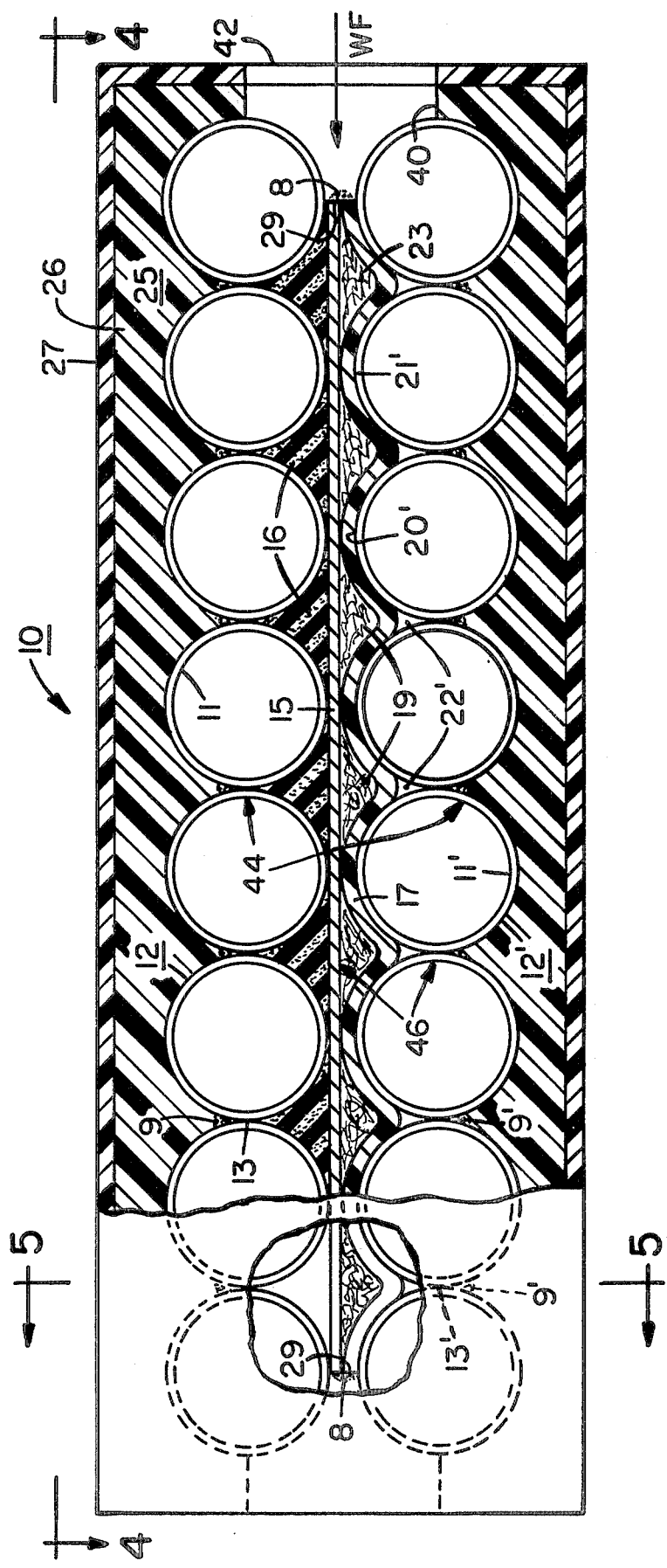
FIG. 3 is a fragmental side section taken along line 3—3 of FIG. 1.
Figure 4:
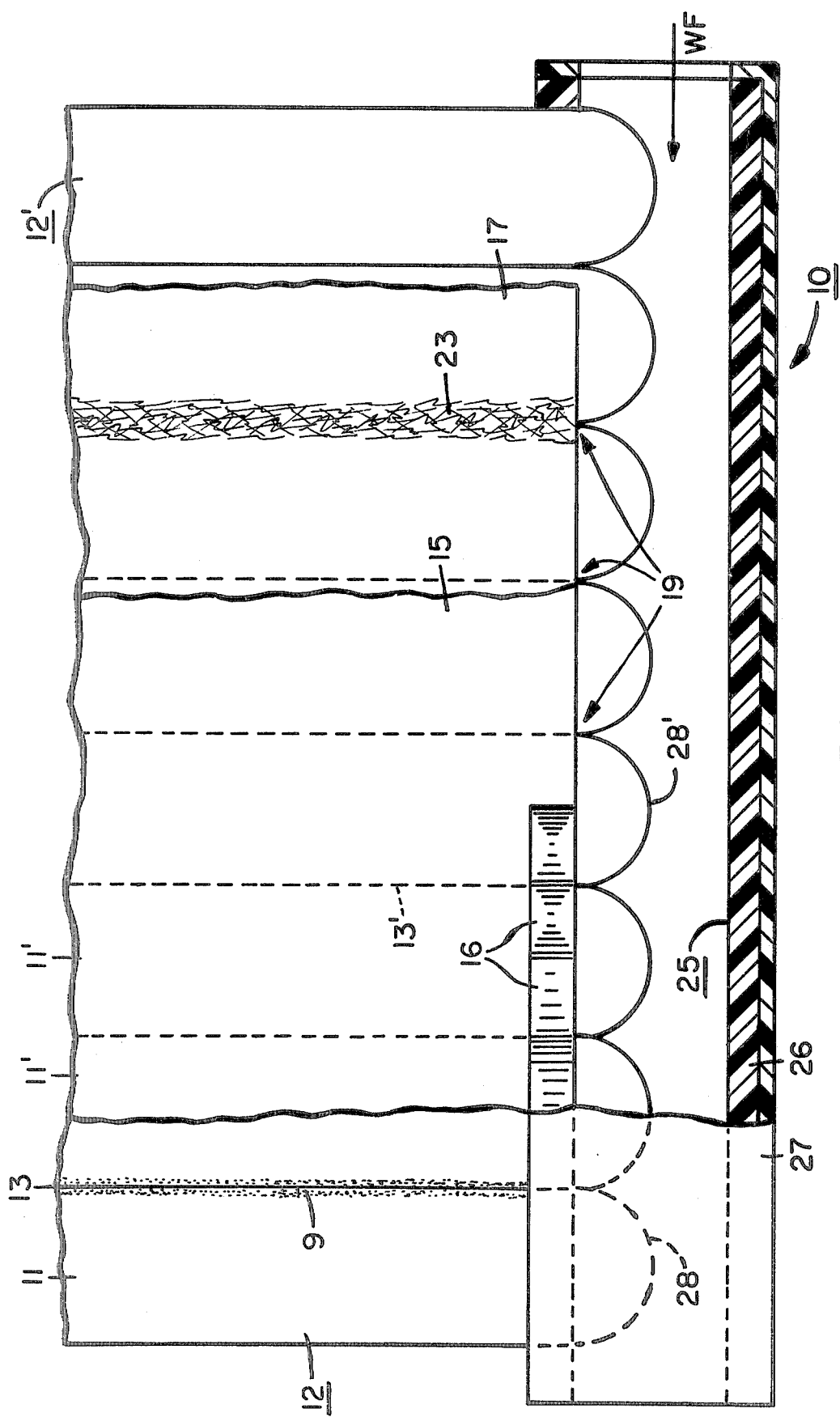
FIG. 4 is a fragmented top section taken along line 4—4 of FIG. 3.
Figure 5:
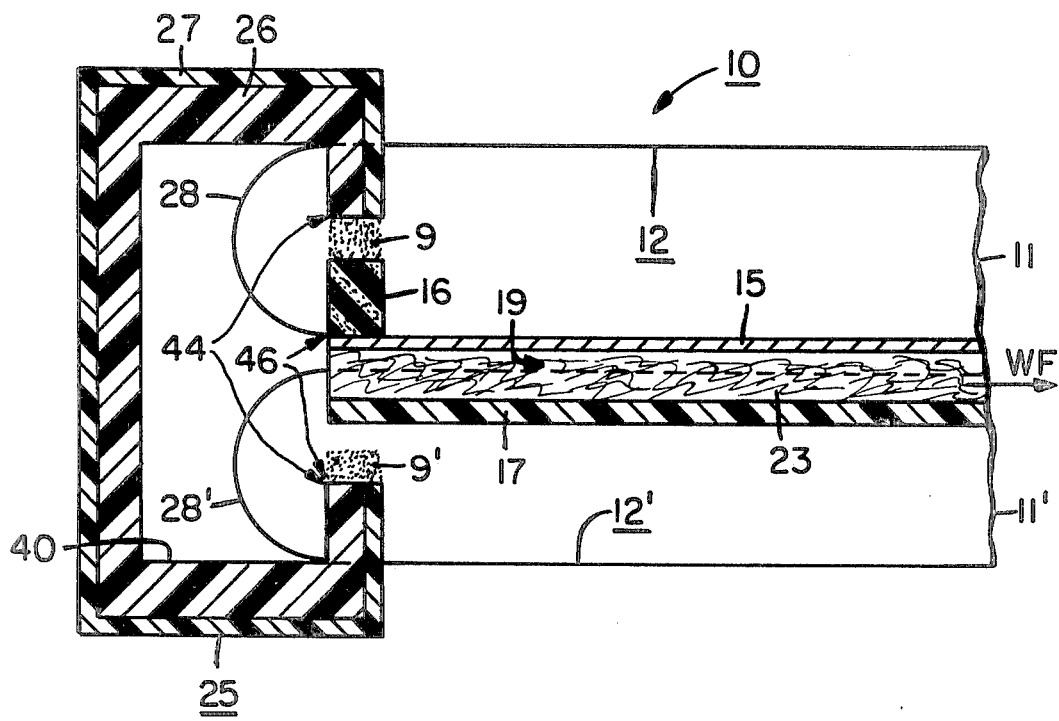
FIG. 5 is a fragmented side section taken along line 5—5 of FIG. 3.

In FIGS. 1, 2 and 3 there is illustrated a solar collector 10, wherein a respective first and second plurality, or group, of upper and lower tubular members or tubes 11-11' are arranged in parallel axial alignment and formed into respective first and second tube sheets 12-12'. Each of the tubular members or tubes 11-11' may be attached by some appropriate sealing means to its adjacent tube along connecting seams or junctures 13-13'. Sealing could be accomplished by employing a flexible silicone sealer such as silastic, in a bead 9-9' along seam 13-13'. While in the preferred embodiment the tube sheets 12-12' are formed from glass tubes, other structures could be formed into tube sheets by various known methods and from other materials. Upper and lower tube sheets 12-12' may be joined together along lateral seams 29 by sealer bead 8 to thereby define a flow channel including intersticies therebetween.

Each of the tubes 11-11' may be partially evacuated to a selected partial pressure of at least 350 Torr, however a high vacuum of about $10^{-4}$ to $10^{-6}$ Torr is preferred for most efficient results. It should be understood that, the higher the quality of vacuum within the tubes 11-11', the better insulating quality thereof, since a greatly reduced atmosphere will reduce the possibility of convection and conductive heat transfer from the tubes, wherein a portion of collected energy is lost to the ambience via exposed surfaces.

The structure for the collector 10 in FIGS. 1-3 further includes an absorber 15 which may be black crome on a copper foil substrate (a good selective absorber) or other metal foils such as steel or aluminum might be used with proper treatment to provide good absorbtivity. In the preferred embodiment, the absorber 15 has high absorbtivity $\alpha$ (about 0.8 or better) in the visible and low emissivity $\epsilon$ (about 0.2 or less).

In each end of the collector 10 illustrated in FIGS. 1-5, end plugs 16 are formed in intersticies between upper tubes 11 and absorber 15. The end plugs 16 block the intersticies between upper tubes 11 and absorber 15 to establish stagnant air above the absorber 15. Below the absorber 15 there is provided an infrared reflecting film 17 which is roughly conformed to upper surface 20' of the second group of tubes 11'. The film 17 may be an organic plastic film sold under the trademark MYLAR, having a coating of aluminum or aluminum foil. The film 17 provides for infrared reflection of absorbed solar radiation in the form of thermal energy into flow channels 19 defined by intersticies between the lower tube sheet 12' and absorber surface 15. The film 17, also by being roughly conformed to the top surface 20' of lower tubes 11' provides a thin layer of stagnant air 21' between the film 17 and top surface 20' of the tubes 11'. Further, the spaces 22' near the lower seams 13' while greater in volume than a thin layer of air 21' are sufficiently small to provide stagnant air insulation.

Between the entire absorber surface 15 and infrared reflecting film 17 there may be disposed a fibrous material 23, very similar to low density air filter material, which fills the flow channels 19 more or less. The fibrous material or fiber 23 provides for turbulation of working fluid WF.

Each opposed transverse end 28-28' of the respective tube sheets 12-12' of collector 10 is mounted in opposed headers 25-25' which may be a foamed insulation 26 encapsulated in a plastic shell 27 of appropriate profile. Each header 25-25' has a respective first channel 40-40' which is in communication with the flow channels 19 to conduct working fluid WF therethrough. Similarly headers 25-25' have diagonally opposed openings 42-42' for said first channels 40-40'. Transverse openings 44-44' are adapted to mate with transverse ends 28-28' of the tube sheets 12-12' and couple the first channels 40-40' with flow channels 19 through lower open portions 46-46' of said transverse openings 44-44' (see FIGS. 2-3 and 5 for details).

Figure 6:
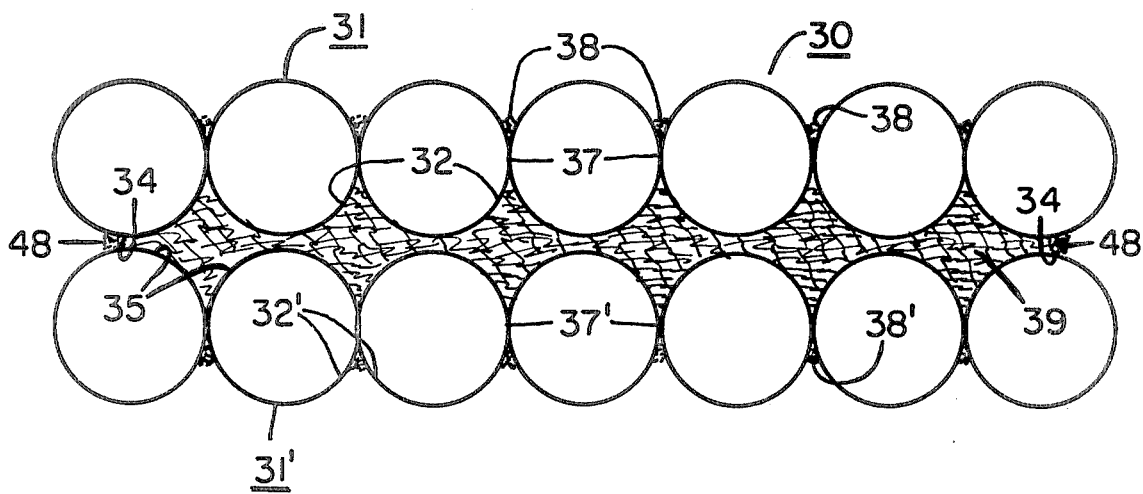
FIG. 6 is a schematic of an alternative arrangement of the present invention in an end view with portions of the structure removed.

In another embodiment of the present invention illustrated in FIG. 6, a collector 30 shown in an end view plan without headers includes respective upper and lower tube sheets 31-31' formed as previously mentioned from respective groups tubular members 32-32'; and sealed along seams 37-37' by sealer beads 38-38'. The pair of tube sheets 31-31' are joined along each lateral ends 34 by a sealer beads 48. An absorber material 35 may be deposited directly on the upper surface of the lower tube sheet 31'. The absorber material 35 may for example be black paint. A fibrous material 33 is located in interstices 39, defining flow channel, between the tube sheets 31-31', said fibrous material 33 acts to turbulate working fluid passing in communication with absorber material 35. The material 33 may be continuous filament fiber glass insulation having a density from about 0.045 to about 0.070 gm/cm$^3$. It may for example be air filter material, which is used in domestic and industrial hot air heating systems to filter coarse particulates from the air system. In FIG. 3, the material just described may be used for fibrous material 23 in that embodiment.

Variations in the collector illustrated may be perceived. For example, a glass micro-sheet appropriately coated may act as absorber 15 in FIGS. 1-3. A dimpled or quilted coated copper foil might also be utilized. The complexity of each element naturally increases the collector cost and the examples herein have been described in this disclosure to illustrate some of the many possible alternatives so that efficiency and cost can be optimized for the particular application. For example the collector 10 illustrated in FIGS. 1-5 is more complex and costly than that illustrated in FIG. 6. While the former may provide the more expensive it may be more cost effective than the latter. Each variation must ultimately be evaluated on its merits.

While there has been provided, what are considered to be the preferred embodiments of the present invention, it will be obvious to those skilled in the art that various modifications and changes may be made therein, and it is intended in the present invention to cover all such modifications as fall within the true spirit and scope of the invention.

We claim:
1. A solar energy collector structure comprising:
a plurality of partially evacuated tubular members substantially transparent to incident solar radiation, said tubular members having opposed lateral ends being arranged in a first and second group and lying adjacent one another in parallel axial alignment, means for joining each tubular member next to each adjacent tubular member of the group to form a first and second respective tube sheet structure;
said tube sheets arranged adjacent each other in tandem to form at least one flow channel therebetween in a self-supporting structure;
an absorber member disposed within said flow channel for intercepting and absorbing solar energy; and
an insulating film having deposited thereon a radiation reflecting substance located behind said absorber member disposed over and conforming closely to a surface of said second tube sheet for forming an insulating space between the insulating film and the second tube sheet to thereby suppress radiation, conduction and convection from said absorber in a direction out of the interior of the flow channel.

2. The solar energy collector of claim 1 further including: header means engaging with opposite free transverse ends of the tube sheets for providing inlet and outlet passages in communication with said flow channel.

3. The solar energy collector of claim 1 wherein said absorber member comprises: an absorptive metallic foil disposed between said tube sheets.

4. The solar collector of claim 3 including: plug means for blocking a portion of said flow channel between the first tube sheet and the absorber member such that an insulating space is formed therebetween.

5. The solar collector of claim 1 wherein working fluid is circulated in heat exchange relation with said absorber member and further including: a low density fiber material disposed in said flow channel for providing turbulation to flow of said working fluid to thereby enhance heat exchange.

6. The solar collector of claim 1, wherein said collector is adapted to receive a working fluid into and out of said flow channel in heat exchange relation with said absorber member.

7. The solar energy collector of claim 1, wherein said partially evacuated tubular members are evacuated to a partial pressure ranging from about 350 Torr to about $10^{-6}$ Torr.

8. The solar energy collector of claim 1, wherein said absorber member includes: a coating exhibiting selective absorptive and emissive properties such that in an energy range corresponding to incident solar radiation, absorption of said energy is relatively high and in an energy range corresponding to infra-red energy, emission by radiation is relatively low.

9. The solar energy collector of claim 2, wherein said header means comprises: a unitary body of insulating material for surrounding each of the opposite transverse ends of the self-supporting structure of adjacent tube sheets each of said header means having openings therein, which openings are adapted to mate with corresponding transverse free ends of the so surrounded tube sheets, said headers also having a formed connecting flow channel in communication with the flow channel between the tube sheets.

10. The solar energy collector of claim 9, wherein working fluid flows in heat exchange relation with the absorber surface in said flow channel, and said header means has a longitudinal coupling opening in communication with the transverse opening for providing a flow path through said header for the working fluid, said coupling opening being a corresponding inlet and outlet as determined by flow of said working fluid therethrough.

* * * * *